Dec. 31, 1935.   P. F. WILLIAMS   2,026,008
DEVICE FOR CONNECTING ELECTRICAL CONDUCTORS
Original Filed June 3, 1929   2 Sheets-Sheet 2
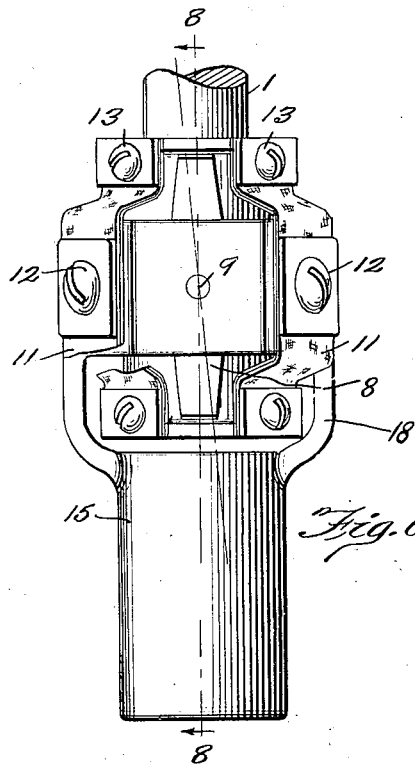
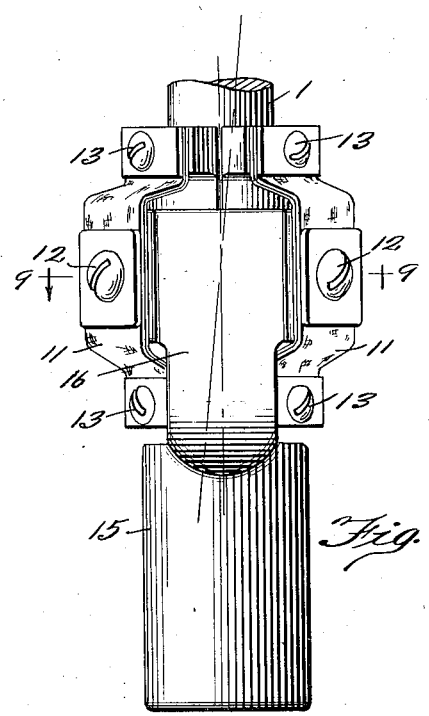
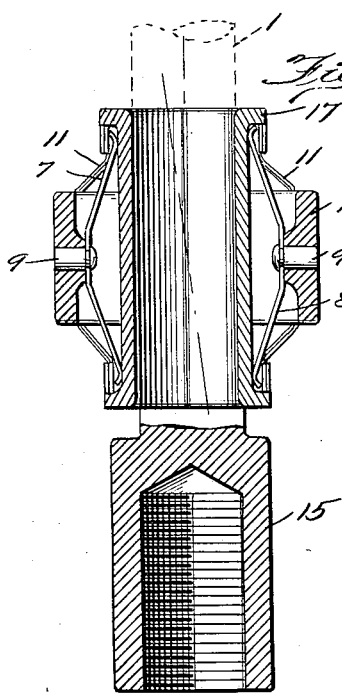
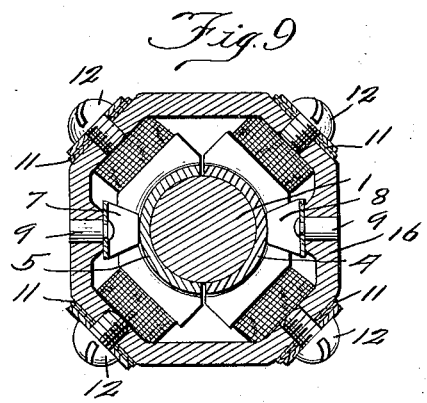
Inventor:
Pearson F. Williams
By A. Miller Belfield.
Atty.

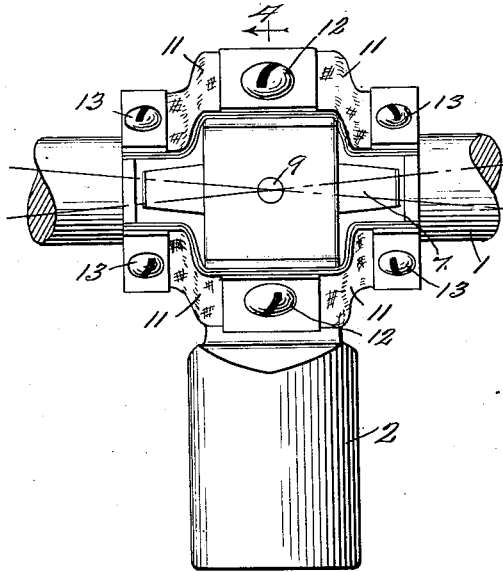
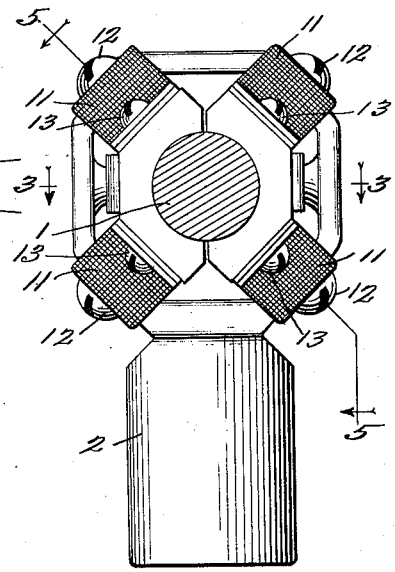
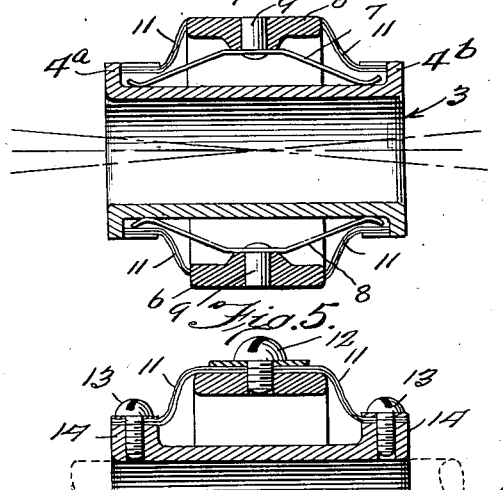
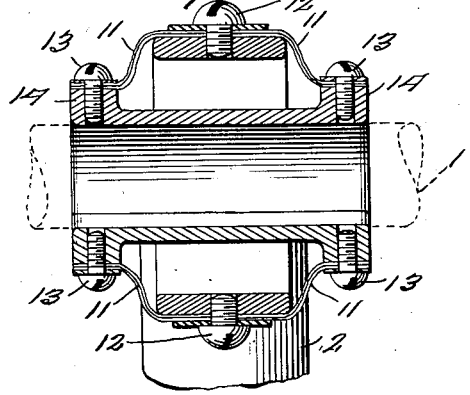
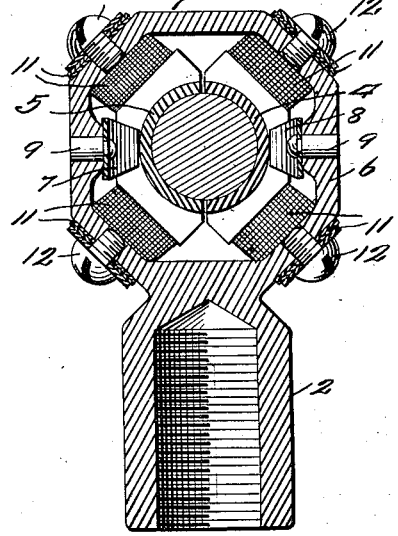

Patented Dec. 31, 1935

2,026,008

UNITED STATES PATENT OFFICE 2,026,008

DEVICE FOR CONNECTING ELECTRICAL CONDUCTORS

Pearson F. Williams, Chicago, Ill., assignor to G. & W. Electric Specialty Co., Chicago, Ill., a corporation of Illinois Application June 3, 1929, Serial No. 367,833
Renewed January 24, 1935

5 Claims.  (Cl. 173—273)

This invention relates to devices for connecting electrical conductors together.

It is desirable to connect electrical cables and overhead conductors in a convenient manner and so as to permit of some flexibility of the connected parts.

The primary object of this invention is accordingy to provide a device for efficiently connecting electrical conductors.

Another object is to provide such a device which is simple of construction and which may be conveniently used.

A further object of this invention is to provide such a device which will permit a maximum of current to be carried from one conductor to the other without endangering the capacity of the device.

Another object of the invention is to provide such a device which will permit of considerable flexibility between connected conductors.

Another object of this invention is to provide such a device which can be quickly operated to connect and disconnect the two conductors.

Other and further objects of this invention will be apparent as the same becomes better understood from an examination of the specification and claims in connection with the accompanying drawings, in which:—

Fig. 1 is a side elevation of a device embodying this invention.

Fig. 2 is a side elevation of the device showing one of the conductors adapted to be connected thereby in section.

Fig. 3 is a section taken at the line 3—3 of Fig. 2.

Fig. 4 is a section taken at the line 4—4 of Fig. 1.

Fig. 5 is a section taken at the line 5—5 of Fig. 2.

Fig. 6 is an elevational view of a modification.

Fig. 7 is a side elevation of the same.

Fig. 8 is a section taken at the line 8—8 of Fig. 6.

Fig. 9 is a section taken at the line 9—9 of Fig. 7.

Referring to the drawings more particularly, reference character 1 designates a horizontal conductor designed to be electrically connected to a second electrical conductor (not shown) adapted to be threaded into a terminal 2 forming a part of the device. The device acts to electrically connect these two conductors together and in addition to the terminal 2 includes an expansible sleeve generally designated by the reference character 3 and surrounding the conductor 1.

The sleeve 3 is radially split to form two similar longitudinal sections 4 and 5 respectively, each adapted to cover nearly one hundred and eighty degrees of the periphery of the conductor and cooperating when pressed together to grip said conductor. The terminal 2 is provided at its upper end with an integral annular extension 6 which surrounds the sleeve 3 and is adapted to resiliently and pivotally connect therewith by means of a pair of oppositely disposed springs 7 and 8. These springs are each pivoted by means of a pin 9 to one upright wall of the annular extension 6, and are provided with opposite and inwardly extending ends, each engaged in suitable recesses in the respective sections 4 and 5, for compressing the sections against the conductor 1 to form a floating contact therewith, these recesses being formed in part by the laterally extending flanges $4^a$ and $4^b$ adjacent the ends of sections 4 and 5 engageable with the ends of the springs 7 and 8 to limit relative movement between the expansible sleeve 3 and the terminal 2.

In addition to the pivotal and yieldable mechanical connection between the sleeve 3 and the terminal 2 just described, which connection is substantially a universal connection, said sleeve and terminal are electrically connected together in such a manner as to permit of the device having substantially the same current carrying capacity as the conductors connected thereby. This electrical connection comprises four copper braided members 11, attached by means of screws 12 centrally of their ends at equally spaced positions on the periphery of the annular extension 6. The opposite ends of the respective conducting members 11 are attached to the corresponding ends of the sleeve 3 by means of screws 13 and raised portions 14 on the sleeve ends for supporting said opposite ends and receiving said screws, two of said members 11 serving to connect the extension 6 with the section 5 of the sleeve and the other two of said members 11 serving to connect said extension with the section 4 of said sleeve.

A plurality of the aforedescribed connecting devices arranged to be connected together by a conductor of predetermined axis, do not require the same accurate predetermined mounting that would be required if it were not for the floating contact afforded by the sleeve 3.

In the modifications shown in Figs. 6 to 9 inclusive, there is provided a terminal member 15 similar to the terminal 2, with the exception that the annular extension 16 for supporting an expansible sleeve (in this case designated as 17), is connected to said terminal member by the integral legs 18, and said annular portion is supported in alignment with the terminal member 15 whereby it will in turn support the said sleeve also in alignment with said terminal member, whereby the two conductors when connected by the device, instead of being at right angles to each other as in the previous embodiment, will be in alignment with each other.

The advantages in the use of the aforedescribed device will be apparent without further description.

I am aware that many changes may be made without departing from the spirit of this invention, and therefore do not wish to be limited to the details shown or described.

I claim:

1. In a device for connecting electrical conductors, the combination of spaced conductors, an annular member connected to one of said conductors, a multi-part radially split tubular member adapted to embrace and contact with the other of said conductors and embraced by said annular member, springs disposed between each of said parts and secured to said annular member and serving to flexibly mount said tubular member within said annular member whereby said tubular member has limited universal movement with respect to said annular member, and flexible conductors connecting said spaced conductors through said members.

2. In a device for connecting electrical conductors, the combination of spaced conductors, an annular member connected to one of said conductors, a multi-part radially split tubular member adapted to embrace and contact with the other of said conductors and embraced by said annular member, springs disposed between each of said parts and secured to said annular member and serving to flexibly mount said tubular member within said annular member whereby said tubular member has limited universal movement with respect to said annular member, and flexible conductors connecting said spaced conductors through said members, said springs and flexible conductors being radially spaced in respect to the axis of said annular member.

3. In a device for connecting electrical conductors, the combination of spaced conductors, an annular member connected to one of said conductors, a multi-part tubular member adapted to embrace and contact with the other of said conductors and embraced by said annular member, spring means disposed between each of said parts and said annular member and serving to mount said tubular member within said annular member, and flexible conductors connecting said spaced conductors through said members, said spring means and flexible conductors being radially spaced in respect to the axis of said annular member, said spring means being connected at spaced points to one of said members and at a point intermediate thereof to the other of said members and said flexible conductors being also connected at spaced points to one of said members and at a point intermediate thereof to the other of said members.

4. In a device for connecting electrical conductors, the combination of spaced conductors, an annular member connected to one of said conductors, a multi-part radially split tubular member adapted to embrace and contact with the other of said conductors and embraced by said annular member, and springs disposed between each of said parts and secured to said annular member and serving to flexibly mount said tubular member within said annular member whereby said tubular member has limited universal movement with respect to said annular member.

5. In a device for connecting electrical conductors, the combination of spaced conductors, an annular member connected to one of said conductors, a multi-part radially split tubular member adapted to embrace and contact with the other of said conductors and embraced by said annular member, and leaf springs disposed between each of said parts and secured to said annular member and serving to flexibly mount said tubular member within said annular member whereby said tubular member has limited universal movement with respect to said annular member, each of said parts having laterally disposed flanges adjacent the ends thereof adapted to engage the ends of said leaf springs to limit relative movement between said conductors.

PEARSON F. WILLIAMS.